United States Patent [19]

Stol

[11] Patent Number: 4,667,083

[45] Date of Patent: May 19, 1987

[54] TORCH FOR PREHEATING A CONTINUOUSLY FED WELDING WIRE

[75] Inventor: Israel Stol, Pittsburgh, Pa.

[73] Assignee: Westinghouse Electric Corp., Pittsburgh, Pa.

[21] Appl. No.: 829,734

[22] Filed: Feb. 14, 1986

[51] Int. Cl.$^4$ .............................................. B23K 9/16
[52] U.S. Cl. .............................. 219/136; 219/137.62; 219/137.44; 219/74
[58] Field of Search ................ 219/74, 75, 136, 137.2, 219/137.42, 137.44, 137.61, 137.62

[56] References Cited

U.S. PATENT DOCUMENTS

| | | | |
|---|---|---|---|
| 2,347,646 | 5/1944 | Smith | 219/136 |
| 2,777,928 | 1/1957 | Bernard | 219/137.44 |
| 2,963,570 | 12/1960 | Rieppel | 219/137.44 X |
| 3,544,758 | 12/1970 | dal Molin | 219/74 X |
| 4,309,590 | 1/1982 | Stol | 219/137.62 |
| 4,447,703 | 5/1984 | Stol | 219/136 |

FOREIGN PATENT DOCUMENTS 2807684 8/1979 Fed. Rep. of Germany ........ 219/74

OTHER PUBLICATIONS

Psaras, G. G. et al., "Torches for Welding Aluminum and its Alloys with a Consumable Electrode in Shielding." Weld. Prod. (GB), vol. 17, No. 7, (Jul. 1970, pp. 72–73.).

Primary Examiner—E. A. Goldberg
Assistant Examiner—C. M. Sigda
Attorney, Agent, or Firm—Thomas R. Trempus

[57] ABSTRACT

A torch for use in welding has a first embodiment for gas metal arc welding and a second embodiment used for hot wire gas-tungsten arc welding. Both embodiments include a torch housing having a first and second end. A wire guide tube is centrally disposed within the housing. An upper electrode contact tip, a lower electrode contact tip and a dielectric material disposed therebetween are positioned at one end of the wire guide tube. An inner power cooling assembly comprises a first cylindrical member concentrically disposed about the wire guide tube and provides electric power to the upper electrode contact tip. The inner power cooling assembly defines a first chamber within which cooling water is circulated in contact with the upper electrode contact tip. An outer power cooling assembly comprises a second cylindrical member and is electrically isolating from the inner power assembly. The second cylindrical member is in electrical communication with the lower electrode contact tip and defines therewithin a second chamber within which cooling water is circulated. In the gas metal arc welding configuration, a gas supply assembly is included in the torch housing and comprises an outer gas tube circumferentially disposed about the second cylindrical member.

16 Claims, 16 Drawing Figures

TORCH FOR PREHEATING A CONTINUOUSLY FED WELDING WIRE

BACKGROUND OF THE INVENTION

1. Field of the Invention

This invention relates to welding and, more particularly, the present invention is directed to an improved welding torch which utilizes a preheating step whereby the wire heat content is increased by means other than welding current.

2. Description of the Prior Art

In a conventional gas-metal arc welding (GMAW) process, heating of the alloyed wire prior to deposition is accomplished by passing welding current through a certain wire length, commonly referred to as the wire stick-out. The power consumed in heating this wire is equal to the product of the square of the welding current and the resistance of the wire. In order to increase the wire deposition rate, the heat content of the wire is increased by increasing the electrical stick-out or the welding current or both.

Excess wire stick-out leads to uncontrolled wire wandering and/or poor deposit quality. Therefore, welding current is the predominant variable that determines deposition rate and the mode of metal transfer through the arc. However, current intensification leads to more power dissipation in the arc. Since approximately 65 to 85% of the arc heat is conducted into the metal workpiece, a higher current would increase arc penetration while increasing deposition rate and decreasing dilution. Although dilution can be reduced by employing higher welding current and slower speeds of travel, these means of control have practical limitations. Higher heat input per unit of length can generate excessive assembly distortion and metallurgical damage in both the deposit and the base metal workpiece, such as heat affected zones (HAZ) underbead cracking and hot-cracking.

In the conventional hot wire gas-tungsten arc welding (HWGTAW) process, heating of the alloyed wire prior to deposition is accomplished by passing heating current through a certain length of wire stick-out. As in the GMAW process, higher wire heat content is adjusted by increasing wire stick-out or increasing heating current or both. This makes the HWGTAW process subject to the similar difficulties experienced by the GMAW process. My issued U.S. Pat. No. 4,447,703 which is assigned to the assignee of the present invention and incorporated by reference herein, teaches a technique for overcoming the aforedescribed difficulties. The aforesaid patent describes a technique for preheating the wire at a location remote from the arc and molten pool, thereby reducing the required welding current and wire stick-out length. Thus, in a gas metal arc welding method in which a power supply feeds welding current through a welding wire electrode into a metal workpiece, the aforesaid patent adds a preheating step in which the wire heat content is increased by means other than the welding current. By increasing the heat content of the wire, a significant reduction in weld dilution is achieved. This preheating is accomplished by passing a current through a wire segment prior to the wire's entry into the stick-out region. The use of preheating wire limits the length of wire stick-out required to reach a desired wire temperature for a given current in the wire, thereby minimizing wire wandering, improving deposit quality and minimizing arc-wire interaction.

My U.S. Pat. No. 4,590,358 which is assigned to the assignee of the present invention and which is incorporated herein by reference, describes a concept for electrically isolated hot wire operations that maximizes the electric contact consistency between the consumable electrode and the electric contact tips. A consumable electrode passes through the bores in two electrode contact tips which are separated by a dielectric member having a bore therethrough. The aforesaid application discloses that the key to obtaining consistent preheating of the wire by passing current between the two electrode contact tips and the length of consumable electrode therebetween resides in ensuring that the bores through which the consumable electrode passes are never both coaxial with the torch body and each other.

It is an object of this invention to provide an improved welding torch which incorporates the principles disclosed by my earlier issued patent and application.

It is also an object of this invention to provide a welding torch which permits consistent preheating of the consumable electrode by passing current through a pair of electrode contact tips separated by a dielectric member.

It is yet another object of this invention to provide a welding torch design which requires minimum space requirements and is ideally suited for use in automated applications.

SUMMARY OF THE INVENTION

The invention is directed to a torch for use in welding operations. A first embodiment of the torch is used for gas metal arc welding and a second embodiment of the torch is used for hot wire gas tungsten arc welding. Both embodiments of the torch include a torch housing having a first and second end. A wire guide means is centrally disposed within the housing and includes a wire guide tube having a bore disposed therein dimensioned to convey a welding wire therethrough. An upper electrode contact tip, a lower electrode contact tip and a dielectric material disposed therebetween are positioned at one end of the wire guide tube. The upper and lower electrode contact tips define means whereby electrical contact with the welding wire is established within the torch housing. An inner power cooling assembly comprises a first cylindrical member concentrically disposed about the wire guide means and defining together therewith means through which electric power is conveyed to the upper electrode contact tip. The inner power cooling assembly defines a first chamber within which cooling water is circulated in contact with the upper electrode contact tip. An outer power cooling assembly comprises a second cylindrical member and includes means associated therewith for electrically isolating the outer power assembly from the inner power assembly. The second cylindrical member is in electrical communication with the lower electrode contact tip and defines therewith a second chamber within which cooling water is circulated. In the gas metal arc welding configuration of the torch, a gas supply assembly is included in the torch housing and comprises an outer gas tube circumferentially disposed about the second cylindrical member. The outer gas tube defines in combination with the second cylindrical member a plurality of axial grooves through which gas can be conveyed from the first end of the housing to the second end of the housing proximate the lower electrode contact tip. Both the first and second cooling water chambers defined in the inner and outer power tube assemblies, respectively, contained therein, close tolerance fin-like water dam means which divides each chamber into first and second half sections which are in communication with each other and control the circulation of water through the chambers. An alternative embodiment of the outer power-cooling assembly comprises an outer power tube member concentrically disposed about the inner assembly. Cooling water circulation is provided by a plurality of bores within the outer tube member. The plurality of bores are in restricted communication with one another to define cooling water flow paths.

In the preferred embodiment, the lower portion of the tip surrounding and depending slightly below the lower contact tip is a water-cooled cup housing. This water-cooled cup housing has a continuous circulation of cooling water flowing circumferentially thereabout in order to transfer heat from the cup during welding operations. Another preferred feature resides in the structure of the lower electrode contact tip. The lower electrode contact tip is so configured to minimize the damaging impact of spatter about the exit port of the lower electrode contact tip.

BRIEF DESCRIPTION OF THE DRAWINGS

The above as well as other features and advantages of the present invention can be readily appreciated through consideration of the detailed description of the invention in conjunction with the several drawings in which.

DESCRIPTION OF THE PREFERRED EMBODIMENT

Figure 1A:
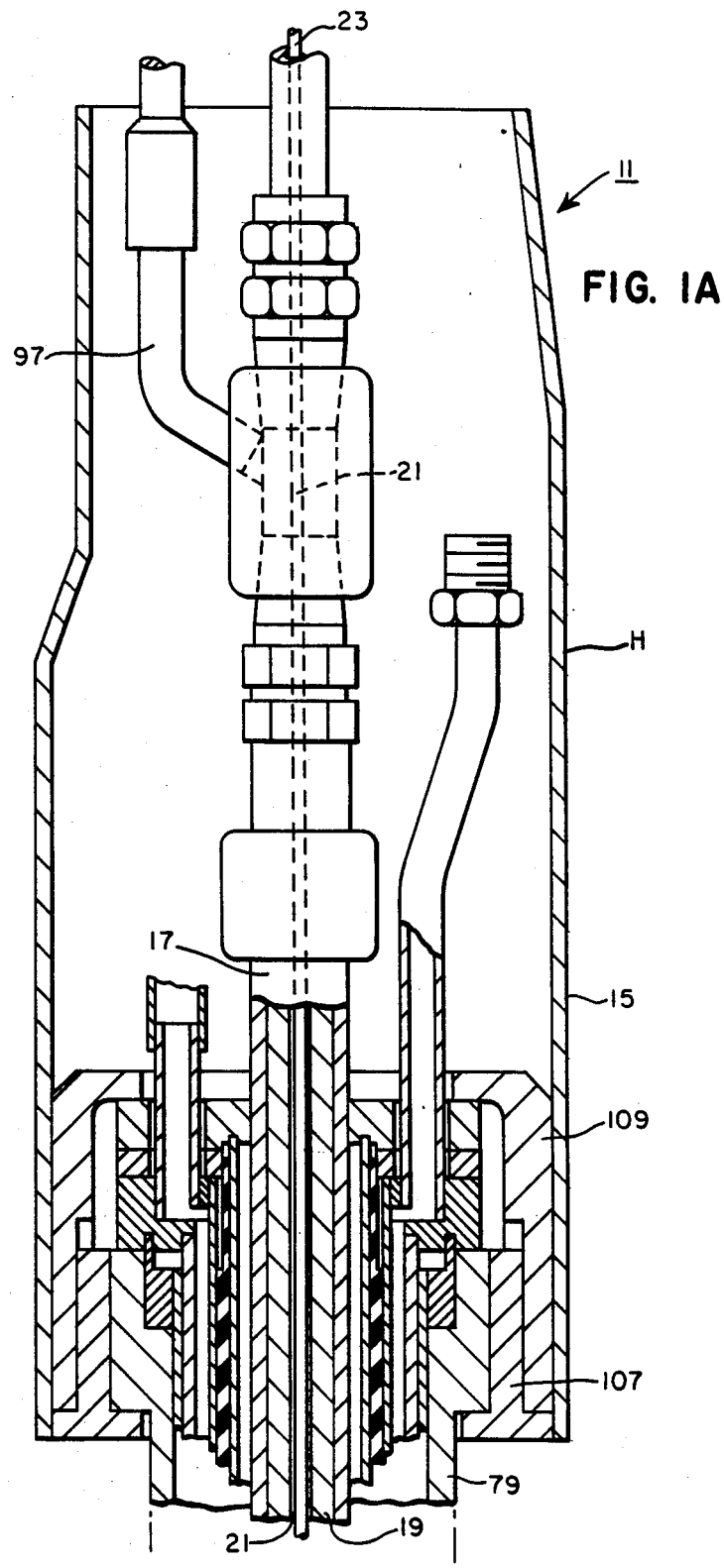
FIGS. 1A and 1B are, in combination, a longitudinal, sectional view of a gas metal arc welding (GMAW) apparatus utilizing improved electrode contact tips.

The present invention is directed to a torch for use in welding operations. In a first embodiment of the torch, the invention provides a torch for use in GMAW (gas metal arc welding) welding operations. In a second embodiment of the torch, the invention provides a torch for an improved HWGTAW process (hot wire gas-tungsten arc welding process). The unique configuration of the welding torch of this invention can be understood through consideration of the several subsystems within that torch, namely, the wire guide tube, the inner power tube assembly, the outer power tube assembly and the gas delivery system. Torch design enhances the desirable concept of obtaining the minimum space required to maintain electrical and mechanical integrity of the torch during operation. In order to minimize the size, a water-cooled torch design is used to reduce torch heating since high current is required for the welding process. Water cooling is accomplished by means of concentric copper tubes which permit water to flow down between two concentric tubes having copper blocks at each end. These tubes are machined in such a way that water flows in the top block and through half the void space between the concentric tube which void is defined by fin obstructions disposed at 180° with respect to each other. The fins act as water dams extending from the top inlet port to just above the lower block. The fins terminate just short of the lower block and permit water to flow to the other half of the void space back to the top and to exit the torch, conveying away heat generated by the welding wire heating process. These fins also support structures which permit thinner wall tubing to be employed, thereby further reducing the torch diameter and weight.

Turning now to FIGS. 1 through 4, a first embodiment of an advanced GMAW torch which is generally indicated by the reference character 11 includes a lower housing portion 13 and an upper housing portion 15 within which the components of the torch are supported. Longitudinally disposed within the housings 13 and 15 is a wire guide means 17 which includes a wire guide tube 19 having a bore 21 axially disposed therewithin and dimensioned to convey a welding wire 23 therethrough. At the lower end of the wire guide tube 19 there is disposed an upper electrode contact tip 15, a lower electrode contact tip 27 and a dielectric member disposed therebetween as at 29. The upper electrode contact tip 25 has a bore 31 therethrough dimensioned to receive the welding wire therein. Likewise, the lower electrode contact tip 27 includes a bore 33 disposed therein and dimensioned to receive the welding wire therethrough. As disclosed in my U.S. Pat. No. 4,590,358 entitled "Improved Apparatus for Electrically Isolated Hot Wire Surfacing Processes", the first electrode contact tip, the second electrode contact tip and the dielectric member each comprise a discrete member mounted in axial alignment and each discrete member has a bore therethrough, as described above, through which the consumable electrode passes. The bore in at least one of the electrode contact tips 25 or 27 is axially displaced with respect to the axis defined by the aforedescribed axial alignment. This configuration of the electrode contact tip bores 31 and 33 maximizes electrical continuity between the electrode contact tips 25 and 27 and the welding wire 23 passing therethrough.

Figure 1B:
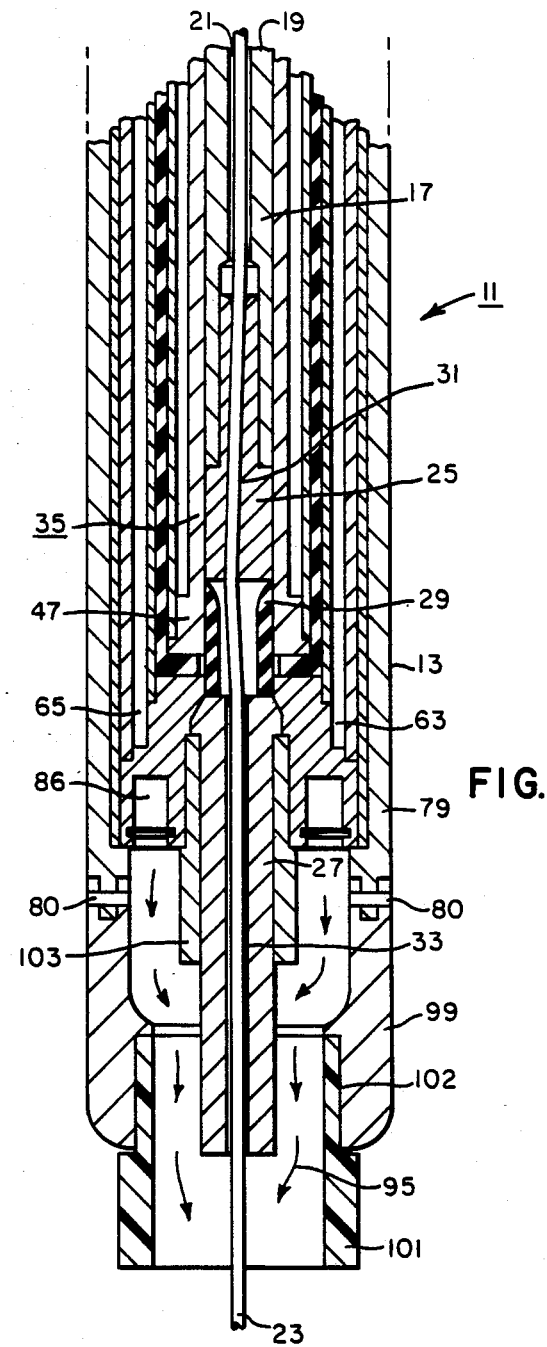
Figure 3:
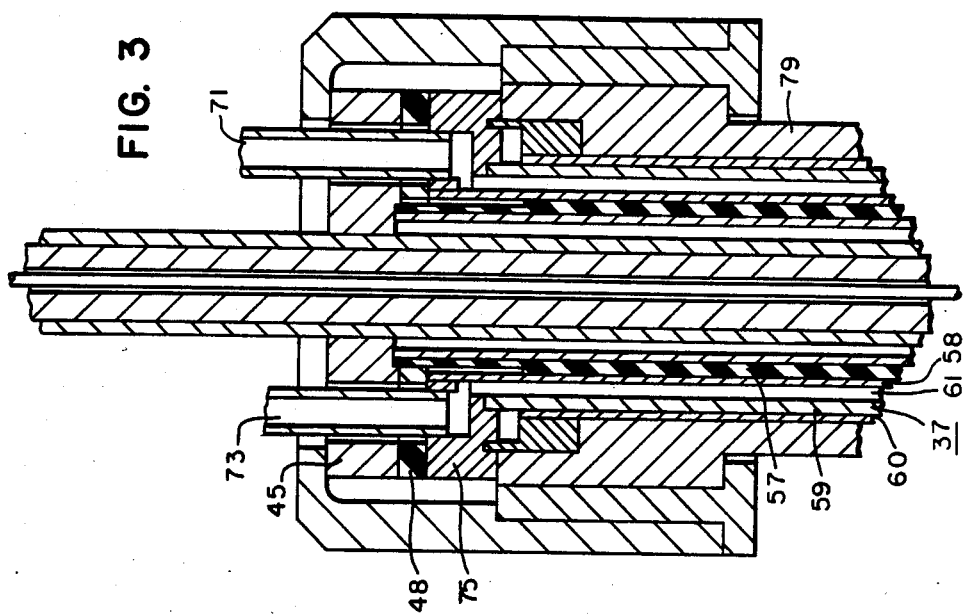
FIG. 3 is a partial sectional view of the improved GMAW torch outer power tube assembly.
Figure 2:
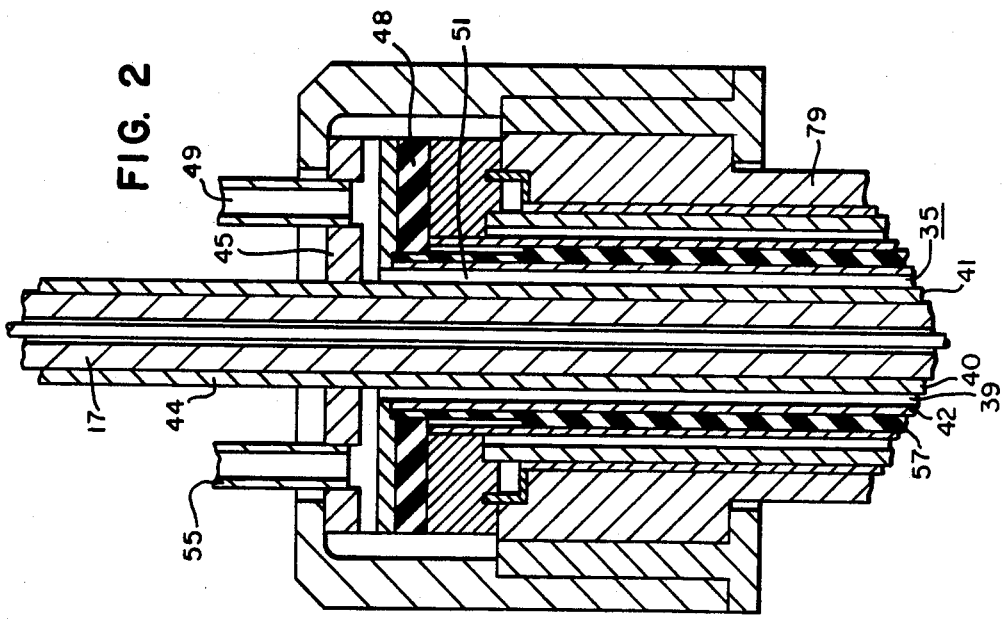
FIG. 2 is a partial sectional view of the improved GMAW torch inner power tube assembly according to the teachings of this invention.

Because of the high current required for the welding process, I have integrated the power delivery system with a cooling system in order to maximize torch efficiency. An inner power cooling assembly which can be seen more clearly in FIG. 2, is indicated at 35 and an outer power cooling tube assembly seen in FIGS. 1 and 3 is indicated at 37. The inner assembly 35, which provides power to the upper electrode contact tip 25, includes inner and outer chamber walls 40 and 42. The inner and outer chamber walls 40 and 42 make up, in part, what will be referred to as a first cylindrical member 41 and defined therebetween a water jacket or chamber 39. The first cylindrical member 41 is concentrically disposed about the wire guide means 17. The inner wall 40 preferably extends as at 44 into the upper portion of the torch housing and supports the wire guide tube 17. Within the chamber 39 there is provided a pair of fins or dams 43 (as more clearly seen in FIG. 9C) which extend from the closed upper portion of the chamber or top block as at 45 to a location which terminates short of the enclosed bottom 47 portion of chamber 39. Cooling water enters the chamber 39 through the combined power-water connection 49 within the upper housing 15. The cooling water flows through the top block 45 downwardly into the half chamber 51 (see FIG. 9C) defined by the fins 43. The cooling water then circulates past the upper contact tip 25 and upwardly through the second half 53 (FIG. 9C) of the chamber 39 back through block 45 and out of the water discharge tube 55. The first cylindrical member 41 is an electrically conductive material such as copper-chromium and is sheathed by an insulating material 57 to provide an electrically isolated inner power tube assembly for conveying electrical power to the upper electrode contact tip 25.

The outer power tube assembly 37 provides both a current input and water cooling to the lower electrode contact tip 27. The outer power tube assembly includes an inner and an outer chamber wall 58 and 60, respectively, which define a second cylindrical member 59 concentrically disposed about the first cylindrical member and insulator 57. The second cylindrical member 59 defines a water cooling chamber 61 having a first half 63 and a second half 65 defined by fins which are substantially similar to the fins or dams 43 shown in FIG. 9C and described above. A combined current input and water cooling inlet 71 is in electrical communication with the second cylindrical member 59 and provides an isolated, cooling water delivery system to the lower electrode contact tip 27. Cooling water is conveyed through inlet 71 into block 75 downwardly through the first half 63 of the chamber 61. Block 45 is separated from block 75 by an insulating member 48 which is disposed therebetween and which electrically isolates the blocks 45 and 75. Cooling water then circulates past the lower electrode contact tip 27 and then upwardly through the second half 65 of the chamber 61 and is conveyed away from the torch via water cooling outlet 73. The now-heated cooling water from both the inner power tube and outer power tube assemblies can be conveyed to appropriate heat exchange means at a location distal from the torch for temperature reduction and recirculation back to the torch.

As indicated above, a dual function is served by the water inlet 49 of the inner power tube assembly 35 and the water inlet 71 of the outer power tube assembly 37. Current supplies for the torch are provided in the same hose as the inlet water supply, such power delivery systems are known and will not be described in detail herein. Power to the upper contact tip 25 is passed through the inner power tube assembly 35 while power to the lower contact tip 27 is passed through the outer power tube assembly 37. Insulation as at 57 between the inner and outer power tube assemblies is provided by a close tolerance Teflon tube which separates the two assembled power tubes. A Teflon disc 48 separates the upper power block 45 of the inner power tube assembly from the upper power block 75 of the outer power tube assembly. Additionally, a fired lava dielectric or alumina tube 29 is disposed between the upper and lower contact tips 25 and 17, respectively. This insulation system protects against electrical failure between the inner and outer power tube assemblies. Additionally, a Micarta tube 79 is placed over the lower portion of the torch for protection of the exposed region of the torch, namely, the lower electrode contact tip 27 from electrical failure to ground. Typically, in automated applications, the upper portion of the torch, i.e., the housing 15, will be enclosed within the end effector of an industrial manipulator which will, of course, be insulated to protect against electrical failure.

Figure 4B:
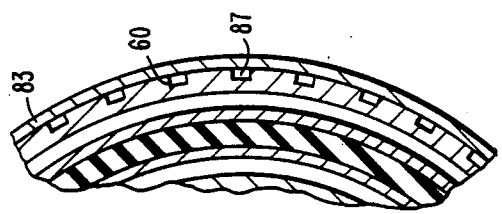
FIGS. 4A, 4B and 4C are detail sectional views of the gas delivery system.
Figure 4C:
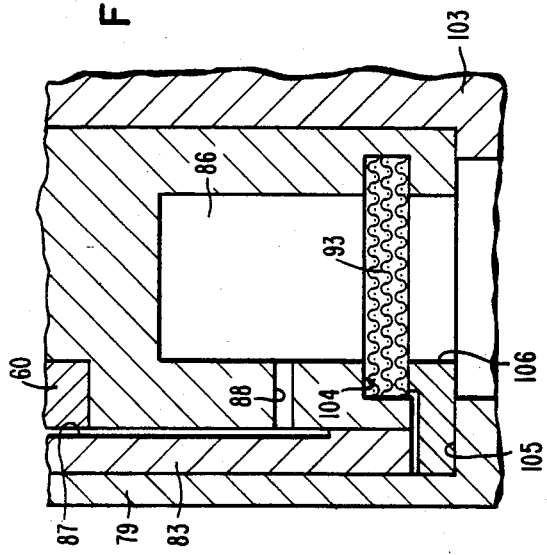
Figure 4A:
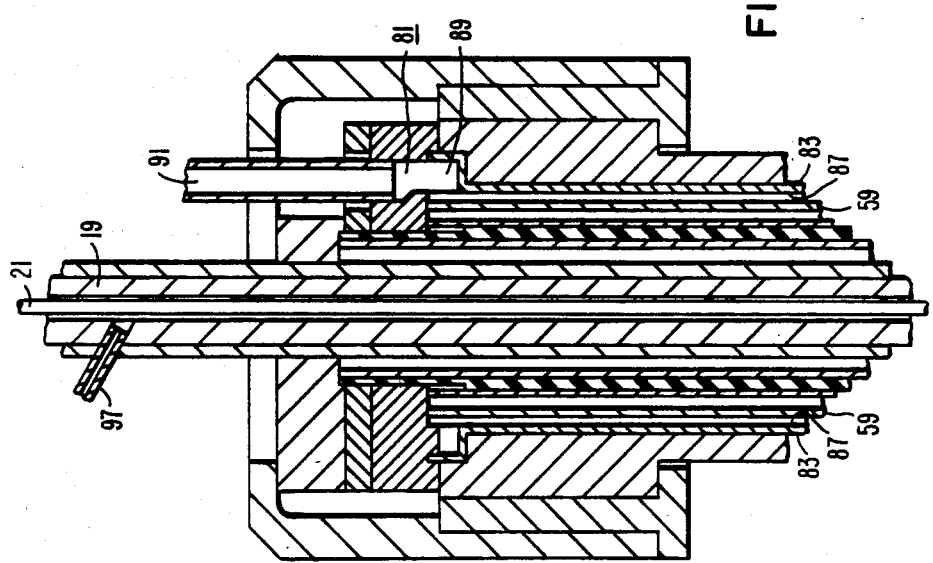

A further feature of the present torch design is the shield gas delivery system 81, shown in FIGS. 4A, 4B and 4C which is incorporated into the torch with a minimum of size increase while still providing sufficient gas flow rates for the welding operation. The gas delivery system 81 includes an outer gas tube 83 concentrically disposed in an abutting relationship with the second cylindrical member 59. As can be seen in the detail of FIGS. 4A and 4B the outer wall 60 of the second cylindrical member 59 includes therein a plurality of axial grooves 87 for gas flow. The axial grooves 87 can be evenly spaced about the entire outer wall 60 of the second cylindrical member 59. Gas flow is uniformly directed through the plurality of axial grooves 87 by means of a gas manifold 89 disposed in the upper portion of the torch. A gas inlet 91 delivers the shielding gas to the manifold 89 from which the gas travels through the axial grooves 87 to a gas discharge chamber 86 through holes 88. From the chamber 86, the gas is discharged through a shield gas diffuser 93 shown in detail in FIG. 4C which is incorporated into the lower section of the torch proximate the lower electrode contact tip 27. I have found that the gas diffuser 93 facing the welding region, i.e., the arc molten pool, can be made of three to five screens stacked on top of one another. The screens can preferably be either 304 stainless steel or copper 200 mesh size. The shield gas diffuser 93 serves to distribute the shield gas uniformly about the stick-out region of the consumable electrode wire as shown by the arrows indicated at 95. The wire guide means 17 by which the consumable electrode wire 23 is conveyed through the torch includes a wire feed gas supply means at 97. An inert gas, such as argon for example, is conveyed into the bore 21 of the wire feed tube 19 in order to substantially eliminate oxidation of the consumable electrode 23 while electrical contact is being effected by means of the upper and lower electrode contact tips 25 and 27.

The lower housing portion 13 of the torch 11 includes several additional features which facilitate both the operation and maintenance of the present torch. Lower housing portion 13 includes the Micarta insulating tube 79 as described above and a gas cup assembly 99 with a replaceable lower gas cup 101 which is threadedly interconnected with the gas cup assembly 99. The replaceable lower gas cup 101 is designed to thread into the gas cup assembly 99 so that welding spatter is prevented from reaching the threaded region as at 102. Even when fully threadedly seated in the gas cup assembly 99, the lower gas cup 101 does not fully abut the gas cup assembly as at 102. The gas cup assembly in turn is removably connected to the Micarta insulating tube 79 through a tongue and groove mating design secured by several pins 80 which facilitate assembly and disassembly. When the lower gas cup assembly 99 is removed, the lower electrode contact tip and dielectric contact tip are accessible for maintenance or replacement. Thus, in the event of a wire jam-up within bore of the dielectric tip 29 or fusion of the wire to the lower electric contact, the gas cup assembly 99 can be removed from the housing 13 and a lower contact tip tightening nut 103 can be removed from the outer power tube assembly 37. As a result, the lower electrode contact tip can be withdrawn from the outer power tube assembly. Additionally, it is preferred that the outside diameter of the lower electrode contact tip be slightly greater than the outside diameter of the dielectrode disposed between the contact tips so that with the lower electrode contact tip removed, the dielectric member can be withdrawn from the wire feed means. The lower tightening nut 103 can also be removed through the use of a deep well socket after removal of the lower gas cup 101. By providing that the electric and ceramic contact tips are generally coaxial, the loading and unloading of these tips from the torch is facilitated.

An additional feature which can be seen by considering the lower housing portion 13 of the torch 11 resides in the technique by which the shield gas diffuser 93 is mounted into the lower section of the torch approximate the lower electrode tip 27. As briefly described above, the shield gas diffuser 93 comprises at least one and preferably several individual disk-like sections of gas diffusing screen stacked one on top of the other. As can be more clearly seen in the torch detail of FIG. 4C, lower housing 13 includes a seat-like recess area 105 on which a removable copper ring member 106 is seated. Additionally, a recess portion 104 in the lower portion of the outer power tube assembly receives the stack of screens therein in a removably engaged relationship. The upper housing portion 15 is threadedly engaged with the lower housing portion 13 as at 107 (FIG. 1A). The upper housing portion 15 includes internally mounted shoulder-like members 109 (FIG. 1A) circumferentially disposed within the housing which engage upper block 45. As the upper housing 15 and lower housing 13 are threaded together, the shoulder portion 109 urges the torch inner and outer chamber components downwardly into the lower housing. At the same time, the lower housing is, in a sense, being drawn up against the lower portion of the torch inner and outer chambers. As a result, the shield gas diffuser 93 through ring member 106 is urged by the seat portion 105 of the lower housing portion 13 into a mounted position. It should be readily appreciated that, due to the unique construction of the lower housing portion 13, those components subject to wear through normal use of the torch, such components including the electrode contact tips, insulating member and shield gas diffuser, can be readily replaced by threadedly disconnecting the upper housing portion 15 from the lower housing portion 13.

Figure 5A:
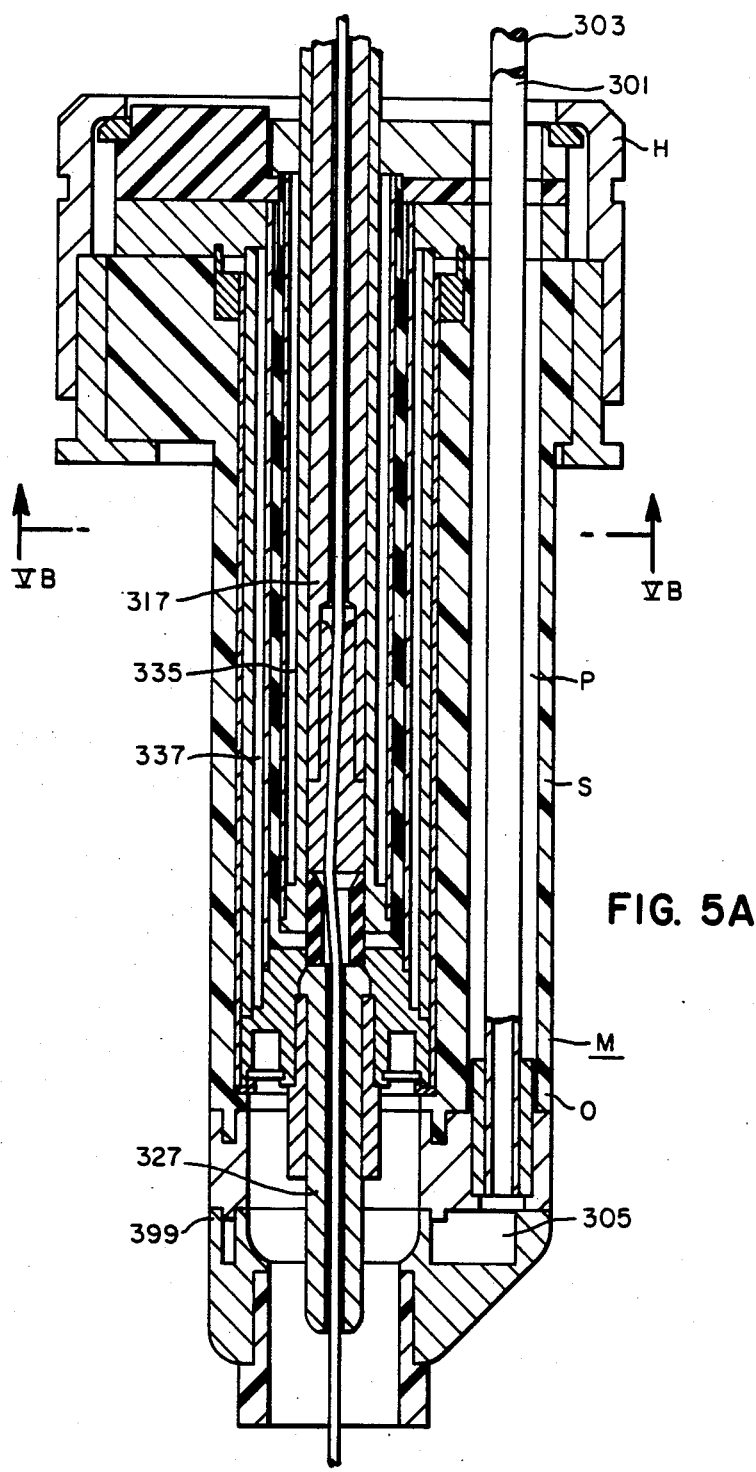
FIGS. 5A and 5B are longitudinal, sectional and cross-sectional views of a gas metal arc welding (GMAW) apparatus illustrating the preferred embodiment of the present invention.
Figure 5B:
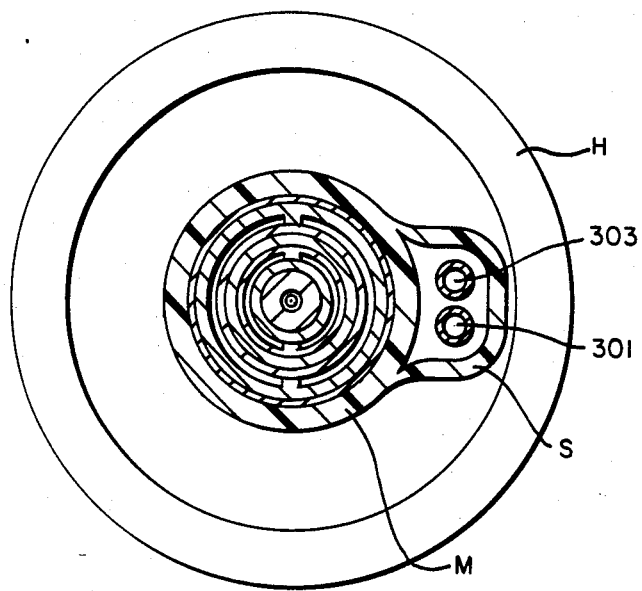
Figure 6B:
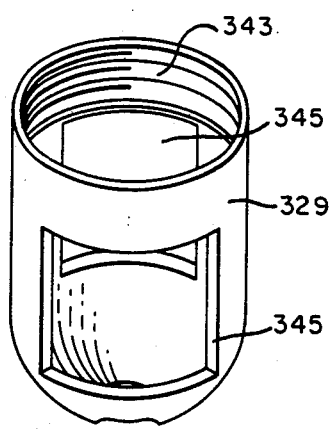
FIGS. 6A and 6B are views of the preferred embodiment of the lower electrode contact tip of the welding apparatus of this invention.
Figure 6A:
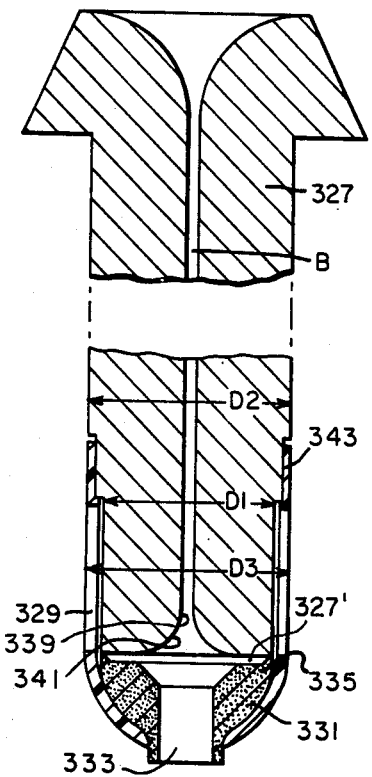

Turning now to FIGS. 5A, 5B and 5C a preferred embodiment of the advanced GMAW torch described in connection with FIGS. 1 through 4 above is shown in longitudinal cross-sectional view and a detail view of the lower contact tip is shown in FIGS. 6A and 6B, respectively. In that the wire guide means 317, the inner power cooling assembly 335 and the outer power cooling tube assembly 337 are substantially identical to those assemblies described in connection with FIGS. 1 through 4 above, reference is made to that discussion. This embodiment of the torch includes a water-cooled lower cup assembly 399, a lower electrode contact tip 327 with anti-spatter means incorporated therein and a unique interlocking shoulder design to prevent undesired rotation of the torch with respect to the supporting structure in the upper regions of the torch body. As can be seen in FIGS. 5A and 5B, the outer Micarta tubing M is of slightly different configuration in order to accommodate two additional cooling water delivery tubes indicated at 301 and 303. The water-cooling delivery tubes 301 and 303 provide a circulation path for water flow which is outside the lower electrode contact tip 327. The lower cup 399 includes a circumferentially disposed chamber therein at 305 which is in communication with both of the tubes 301 and 303 to define a water circulation path therethrough. The tubes 301 and 303 can be threadedly interconnected into the lower cup and slidable with respect to the outer Micarta tubing passages P in which the water delivery tubes 301 and 303 rest. Because the tubes are threadedly interconnected with the lower cup assembly 399, the lower cup assembly 399 can be removed as previously described in connection with the embodiment in FIGS. 1 through 4 and the tubes slid downwardly. While this permits access to the lower electrode contact tip 327, it should be appreciated that this access may be somewhat restricted because the water-cooling tubes are still connected. Alternatively, the upper portion of the welding torch housing H (as shown in FIG. 1A) can be removed to permit access to the cooling water delivery tubes 301 and 303 wherein these tubes can be threadedly removed from the lower cup assembly. Thus, free of these tube connections, the lower cup assembly can be removed from the torch assembly. It has been found that a significant reduction in the temperature of the cup 399 can be achieved by the use of a water cooling system therein. A reduction in the temperature of the lower cup 399 of approximately 250° C. has been accomplished through the use of this cooling system. As can be seen in the cross-sectional view of the torch in FIG. 5B, the Micarta tube M has a shoulder-like region S therein to accommodate the water delivery tubes 301 and 303. Moreover, this shoulder cooperates with the outside Micarta tube O which forms an insulating skin about the torch body to eliminate movement of the outside portion of the torch with respect to the inner torch assembly. FIG. 5A illustrates the circulation path of the cooling water about the lower water-cooled assembly 399.

Turning now to FIGS. 6A and 6B, there is illustrated in FIG. 6A a longitudinal sectional view of a lower electrode contact tip 327 and in FIG. 6B a perspective view of a basket used in cooperation with the lower portion of the electrode contact tip 327. The lower electrode contact tip 327 has been modified to include a basket means 329 and a graphite coupon 331 which is held by the basket in close proximity to the bottom portion of the lower electrode contact tip. As described above, the lower electrode contact tip has a bore B disposed therein through which the electrode wire passes. The graphite coupon 331 also includes a bore therein as at 333. The coupon bore 333 is preferably 1.4 to 1.7 times larger than the inside diameter of the electrode contact tip bore. This ensures that the wire does not contact the coupon. The coupon has a graphite lip portion 335 by which it rests against the bottom portion 327′ of the electrode contact tip 327. This graphite lip minimizes heat conduction from the graphite coupon to the lower electrode contact tip. Additionally, the lower portion of the electrode contact tip bore B is chamfered as at 339 and graphite paint 341 is disposed thereon. The combination of the graphite coupon 331 and the graphite paint 341 on the chamfered lower portion of the lower electrode contact tip bore B minimizes the amount of spatter that will be retained at the bore and potentially cause damage to the bore due to the jamming of electrode wire therein. This obviously enhances the operational time of an electrode contact tip bore and provides improvement to the welding process. The basket 329 supports the coupon in place with respect to the lower electrode contact tip by means of a threaded portion 343. It should be appreciated that the portion of the lower electrode contact tip 327 adjacent the coupon 331 is of a slightly decreased outside diameter as at D1 with respect to the remaining portion of the electrode contact tip as indicated at D2. As a result, heat conduction from the basket to the tip is minimized and the basket can be made so that its outside diameter as at D3 is substantially equal to or less than the outside diameter D2 of the lower electrode contact tip. This arrangement provides a lower electrode contact tip 327 with a generally constant outside diameter throughout substantially the length thereof. The basket 329 which holds the graphite coupon in place is preferably slotted as at 345 as shown in FIG. 6B. The slots in the basket 329 augment convection heat transfer from the lower part of the contact tip to the inert shielding gas flowing about it. The coupon holding basket 329 can be made of, for example, cooper beryllium, copper, copper chromium, molybdenum, or nickel. The lower portion of the basket 329 functions as a radiation shield and spatter reflector. The gasket is both reusable and easily replaceable. The graphite coupon 331 insulates the lower portion of the electrode contact tip from arc radiation, thus, keeping it cooler and preventing or at least minimizing the introduction of spatter at the region where the wire exits the electrode's tip bore. Absent this particular configuration, it is possible that a spatter barrier can form and block the electrode wire's passage through that bore. Additionally, the graphite coupon protects the electrode contact tip from the damage caused by arc climb. Arc climb usually develops due to a slowdown in wire feed rate. In the event of arc climb, the coupon extinguishes the arc and acts as a sacrificial material because it causes the solidification of the wire tips molten end in it. In the event that such solidification of the wire's tip occurs, the graphite simply breaks off under the splatter solidifying under it. The graphite can also be replaced by a dielectric material as long as that dielectric material can withstand the welding process arc's temperature. The graphite paint 341 is applied to the tapered outlet portal of the electrode contact tip. This graphite paint also tends to break away in case spatter reaches this region. However, with the coupon shield and basket, the possibility of spatter striking this region is significantly minimized. The smooth taper in the lower part of the electrode contact tip is to minimize heat buildup about the tip's contact bore where the wire exits. The smooth taper changes the two-dimensional heat transfer of the contact tip lower portion to a three-dimensional heat transfer which is clearly more efficient.

Figure 7:
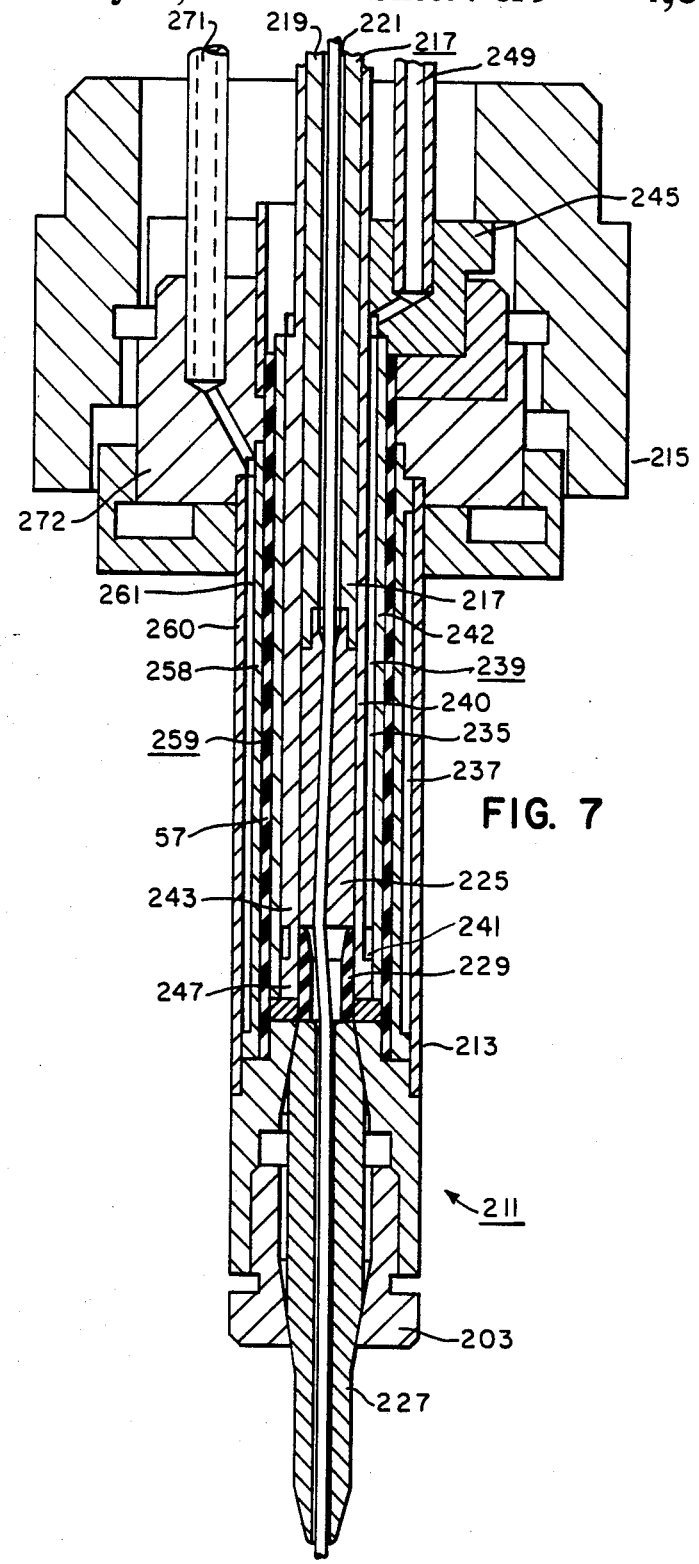
FIG. 7 is a somewhat schematical embodiment of a hot wire gas-tungsten arc welding (HWGTAW) apparatus utilizing improved electrode contact tips.
Figure 8:
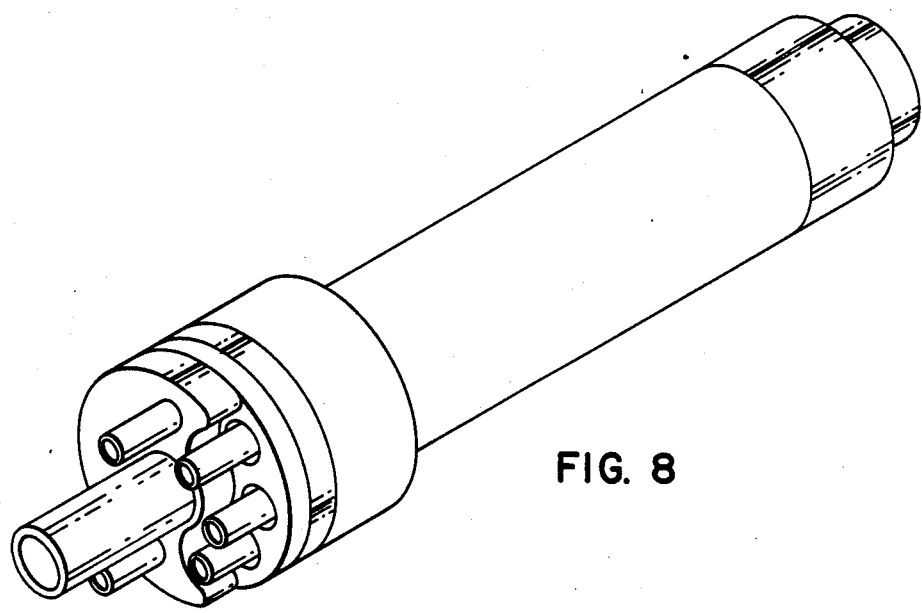
FIG. 8 is a perspective view of the upper housing of a GMAW torch, illustrating the power, cooling and gas delivery systems connections.

Turning now to FIG. 7, an alternative embodiment of the torch design is illustrated. This alternative embodiment is used for tungsten-inert gas welding operations, i.e., HWGTAW, in which a filler wire is first heated to a high temperature by resistance heating caused by a current flowing through the filler wire and is then fed to the weld. This alternative embodiment also utilizes the wire feed means, the inner power tube assembly and the outer power tube assembly in a configuration which is substantially similar to that configuration described in combination with the GMAW torch.

The alternative welding torch embodiment is generally indicated by the reference character 211 and includes a lower housing portion 213 and an upper housing portion 215. Longitudinally disposed within the housing portions 213 and 215 is a wire guide means 217 which includes a wire guide tube 219 having a bore 221 axially disposed therewithin and dimensioned to convey a welding wire therethrough. At the lower end of the wire guide tube 219 there is disposed an upper electrode contact tip 225, a lower electrode contact tip 227 and a dielectric member 229 disposed therebetween. As described in detail above, the bore in at least one of the electrode contact tips 225 or 227 is axially displaced with respect to an axis defined by the first electrode contact tip, the second electrode contact tip and the dielectric member. This torch also includes an integrated power delivery and cooling system which maximizes torch efficiency. An inner power cooling assembly is indicated at 235 and an outer power cooling tube assembly is indicated at 237. The inner assembly provides power to the upper electrode contact tip 225 and defines a water jacket or chamber 239 by means of an inner chamber wall 240 and an outer chamber wall 242 which are concentrically disposed about the wire guide means 217. The chamber walls 240 and 242 define, in part, a first cylindrical member 241. Within the chamber 239 there is provided a pair of fins or dam-like members 243 (only one of which is shown) which extend from the closed upper portion of the chamber 245 to a location which terminates short of the enclosed bottom portion of chamber 239. Cooling water enters the chamber 239 through the combined power-water connection 249 within the upper housing 215. The cooling water flows through the top block downwardly into a first chamber defined by the fins. The cooling water then circulates past the upper contact tip 225 and upwardly through the second half of the chamber 239 and back through block 245 and out through the water discharge tube. This water circulation technique is substantially the same as the procedure described in association with FIGS. 1A, B and C above.

The outer power tube assembly 237 provides both a current input and water cooling to the lower electrode contact tip 227. The outer power tube assembly includes a second cylindrical member 259 which is concentrically disposed about the first cylindrical member and insulator 57, includes an inner and outer chamber wall 258 and 260, respectively. The second cylindrical member 259 defines a water cooling chamber 261 having a first half and a second half defined by fins. A combined current input and water cooling inlet 271 is in electrical communication with the second cylindrical member 259 and provides an isolated, cooling water delivery system to the lower electrode contact tip 227. Cooling water is conveyed through inlet 271 through block 272 downwardly through the first half of the chamber 261. Cooling water then circulates past the lower electrode contact tip 227 and then upwardly through the second half of the chamber 261 and is conveyed away from the torch via water cooling outlet. It should be readily appreciated that the combined cooling and power delivery systems which were described in detail in connection with the gas metal arc welding torch illustrated in FIGS. 1 through 4 are substantially identical to the power and water cooling delivery systems described in association with the alternative embodiment.

The wire guide means 217 by which the consumable electrode wire is conveyed through the torch includes a wire feed gas supply means. An inert gas is conveyed into the bore 221 of the wire feed tube 219 in order to substantially eliminate oxidation of the consumable electrode while the heating of the electrode is being effected by means of upper and lower electrode contact tips 225 and 227.

The lower housing portion 213 of the torch 211 is of somewhat simpler design configuration than the torch previously described. Because a shielding gas is not being delivered via this torch to the welding operation, access to the lower electrode contact tip 227 and dielectric member 229 is had through the removal of a low contact tip tightening nut 203. Due to the unique axial alignment of both the lower electrode contact tip and the dielectric member, the removal of the tightening nut 203 permits both of the aforesaid members to be withdrawn from the torch body, thus facilitating the maintenance of the torch.

Figure 9B:
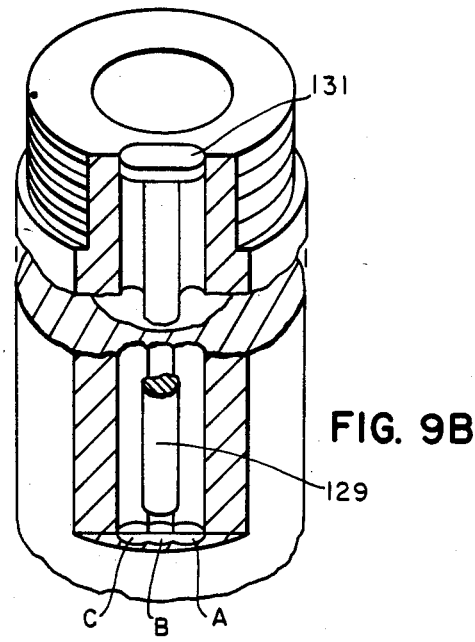
FIGS. 9A, 9B and 9C illustrate an alternative embodiment of a power tube assembly.
Figure 9A:
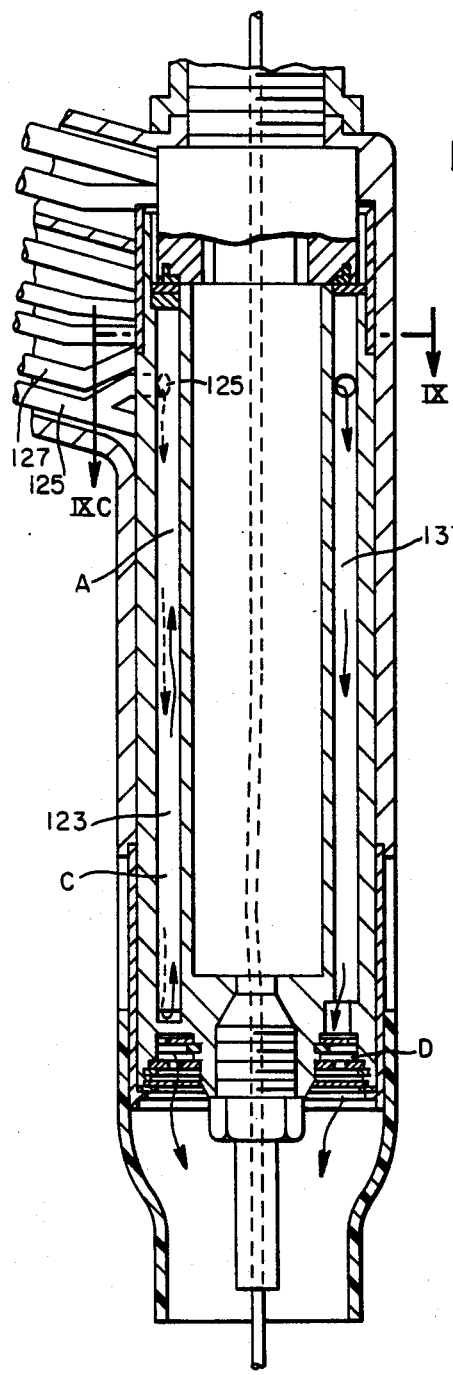
Figure 9C:
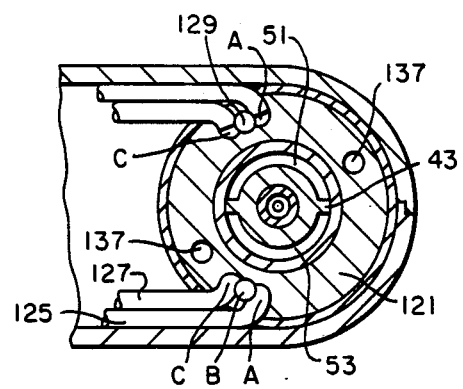

Turning now to FIGS. 9A, 9B and 9C an alternative embodiment of the outer power tube assembly is illustrated. By contrast to the outer power tube assembly embodiment described hereinabove which included concentric members defining a chamber therebetween, this embodiment utilizes a solid outer power tube assembly generally indicated by the reference character 121. Cooling of the outer power tube assembly 121 is affected by means of at least one and preferably two or more water cooling channels generally indicated at 123. Each water cooling channel 123 consists of a cold water inlet 125 and a hot water return outlet 127. The unique and simplified structure by which the cooling channels 123 are constructed can be best appreciated through consideration of both FIGS. 9B and 9C. Three holes indicated at A, B and C are bored down through the outer power tube assembly so as to be proximate one another, with the B hole or center hole physically overlapped by the A and C holes which are symmetrically placed on both sides thereof. A dividing rod 129 is inserted into the B hole such that the A hole and C hole are now physically isolated from one another along substantially all of the length thereof. However, the dividing rod 129 is not inserted down to the base of the outer power tube member 121 so that the A channel and C channel are in communication with one another through the open bottom portion of the B channel. Thus water circulating down through the cool water inlet 125 or A tube can pass through the B channel and return for discharge through the C channel or hot water output 127. Thus, by making the rod 129 shorter than the three overlapping holes and shouldering it with member 131, a channel is formed perpendicular to the several channels A, B and C. This channel structurally communicates the water from the cooling channel to the hot return channel. The water inlet and outlet tubes can be in communication with supply and heat exchange means not illustrated herein by means of tubing which are in fluid communication with appropriate water inlet and outlet channels 125 and 127. This particular configuration is useful when it is desired that the cooling water supply source be situated alongside the torch housing as opposed to the previous embodiments in FIGS. 1 and 5 for instance when the supply means are coaxial with the torch housing. It should also be noted that in the solid outer power tube assembly 121, one or more gas delivery channels 137 can be provided therein. These channels 137 would extend from the lower portion of the outer power tube assembly whereby communication would be established with the shield gas diffuser 'D' as previously described to the upper portion of the outer power tube assembly wherein a shield gas supply is interconnected with the outer power tube assembly. The shield gas supply can be either coaxial with the outer power tube assembly as previously described or disposed so as to enter the outer power tube assembly in a relationship which would be substantially perpendicular with the gas delivery channels 137.

The outer power tube assembly alternative embodiment illustrated in FIGS. 9A, 9B and 9C can be used in conjunction with the inner power tube assembly described hereinabove to provide an alternative torch configuration. In all other respects, such as the configuration of the shield gas diffuser as well as the electrode contact tips and upper and lower housing assembly, the alternative solid outer power tube member and assembly would function to carry out the advantages of this invention as described elsewhere herein.

What has been described is an improved welding torch which, in one embodiment, can be used for gas metal arc welding operations and, in a second embodiment, can be used in hot wire gas-tungsten arc welding operations. Although certain preferred embodiments have been shown and described, it should be understood that many changes and modifications may be made therein without departing from the scope of the appended claims.

What is claimed is:

1. An improved gas metal arc welding (GMAW) torch comprising:

a torch housing having a first and a second end;

wire guide means centrally disposed within said housing, said wire guide means comprising a wire guide tube having a bore disposed therein, said bore dimension to convey a welding wire therethrough and including means in communication with said bore for conveying gas therethrough, an upper electrode contact tip, a lower electrode contact tip and a dielectric material disposed therebetween positioned at one end of said wire guide tube, said upper and lower electrode contact tips defining means whereby electrical contact with the welding wire is established within said torch housing, said lower electrode contact tip including a graphite coupon removably attached thereto by a basket means which supports said coupon through a threaded association with said lower electrode contact tip;

an inner power-cooling assembly comprising: a first generally cylindrical member concentrically disposed about said wire guide means and defining means through which electrical power to said upper electrode contact tip is provided, said first cylindrical member defining a first chamber having water dam means therewithin, dividing said first chamber into first and second sections in communication with each other whereby the circulation of water through said first chamber is controlled by said dam means;

an outer power cooling assembly comprising: a second generally cylindrical member concentrically disposed about said first cylindrical member and having means associated therewith for electrically isolating said outer assembly from said inner assembly, said second cylindrical member being in electrical communication with said lower electrode contact tip and defining therewithin a second chamber having water dam means within said second chamber, dividing said second chamber into first and second sections in communication with each other whereby the circulation of water through said second chamber is controlled by said dam means;

a lower cup assembly detachably secured to said torch housing second end, said lower cup assembly having a circulation path for cooling water flow proximate said lower electrode contact tip; and a gas supply assembly comprising an outer gas tube circumferentially disposed about said second cyindrical member and defining together therewith a plurality of axial groove means through which gas can be conveyed from the first end to the second end of said housing proximate said lower electrode contact tip.

2. The improved GMAW torch of claim 1 wherein the first cylindrical member comprises an inner chamber wall and an outer chamber wall and wherein the water dam means extend therebetween to control the circulation of cooling water therethrough.

3. The improved GMAW torch of claim 1 wherein the second cylindrical member comprises an inner chamber wall and an outer chamber wall and wherein the water dam means extends therebeween to control the circulation of cooling water therethrough.

4. The improved GMAW torch of claim 1 wherein the gas supply assembly further comprises a gas diffuser means incorporated into the torch second end proximate the lower electrode contact tip, said gas diffuser means including means for distributing gas uniformly about the lower electrode contact tip.

5. An improved gas metal arc welding (GMAW) torch comprising:

a torch housing having a first and a second end;

wire guide means centrally disposed within said housing, said wire guide means comprising a wire guide tube having a bore disposed therein, said bore dimension to convey a welding wire therethrough and including means in communication with said bore for conveying gas therethrough, an upper electrode contact tip, a lower electrode contact tip and a dielectric material disposed therebetween positioned at one end of said wire guide tube, said upper and lower electrode contact tips defining means whereby electrical contact with the welding wire is established within said torch housing;

an inner power-cooling assembly comprising: a first generally cylindrical member concentrically disposed about said wire guide means and defining means through which electrical power to said upper electrode contact tip is provided, said first generally cylindrical member defining a first chamber having water dam means therewithin, dividing said first chamber into first and second sections in communication with each other whereby the circulation of water through said first chamber is controlled by said dam means;

an outer power cooling assembly comprising: a second generally cylindrical member concentrically disposed about said first generally cylindrical member and having means associated therewith for electrically isolating said outer assembly from said inner assembly, said second cylindrical member being in electrical communication with said lower electrode contact tip and defining therewithin a second chamber having water dam means within said second chamber, dividing said second chamber into first and second sections in communication with each other whereby the circulation of water through said second chamber is controlled by said dam means; and a gas supply assembly comprising an outer gas tube circumferentially disposed about said second cylindrical member and defining together therewith a plurality of axial groove means through which gas can be conveyed from the first end to the second end of said housing proximate said lower electrode contact tip.

6. The improved GMAW torch of claim 5 wherein the first cylindrical member comprises an inner chamber wall and an outer chamber wall and wherein the water dam means extend therebetween to control the circulation of cooling water therethrough.

7. The improved GMAW torch of claim 5 wherein the second cylindrical member comprises an inner chamber wall and an outer chamber wall and wherein the water dam means extends therebetween to control the circulation of cooling water therethrough.

8. The improved GMAW torch of claim 5 wherein the torch housing second end includes a gas cup assembly detachably secured thereto and a lower gas cup threadedly interconnected to said gas cup assembly.

9. The improved GMAW torch of claim 5 wherein the gas supply assembly further comprises a gas diffuser means incorporated into the torch second end proximate the lower electrode contact tip, said gas diffuser means including means for distributing gas uniformly about the lower electrode contact tip.

10. An improved hot wire gas-tungsten arc welding torch comprising:

a torch housing having a first and a second end;

wire guide means centrally disposed within said housing, said wire guide means comprising a wire guide tube having a bore disposed therethrough and including means in communication with said bore for conveying gas therethrough; said bore dimension to convey a welding wire therethrough, an upper electrode contact tip, a lower electrode contact tip and a dielectric material disposed therebetween positioned at one end of said wire guide tube, said upper and lower electrode contact tips defining means whereby electrical contact with the welding wire is established within said torch housing;

an inner power-cooling assembly comprising: a first generally cylindrical member concentrically disposed about said wire guide means and defining means through which electrical power to said upper electrode contact tip is provided, said first generally cylindrical member including therein a first chamber having water dam means therewithin, dividing said first chamber into first and second sections in communication with each other whereby the circulation of water through said first chamber is controlled by said dam means; and an outer power cooling assembly comprising: a second generally cylindrical member concentrically disposed about said first generally cylindrical member and having means associated therewith for electrically isolating said outer assembly from said inner assembly, said second generally cylindrical member being in electrical communication with said lower electrode contact tip and defining therewithin a second chamber having water dam means within said second chamber, dividing said second chamber into first and second sections in communication with each other whereby the circulation of water through said second chamber is controlled by said dam means.

11. The improved torch of claim 10 wherein the first cylindrical member comprises an inner chamber wall and an outer chamber wall and wherein the water dam means extend therebetween to control the circulation of cooling water therethrough.

12. The improved torch of claim 10 wherein the second cylindrical member comprises an inner chamber wall and an outer chamber wall and wherein the water dam means extends therebetween to control the circulation of cooling water therethrough.

13. An improved gas metal arc welding (GMAW) torch comprising:

a torch housing having a first and a second end;

wire guide means centrally disposed within said housing, said wire guide means comprising a wire guide tube having a bore disposed therein, said bore dimension to convey a welding wire therethrough, an upper electrode contact tip, a lower electrode contact tip and a dielectric material disposed therebetween positioned at one end of said wire guide tube, said upper and lower electrode contact tips defining means whereby electrical contact with the welding wire is established within said torch housing;

an inner power-cooling assembly comprising: a first generally cylindrical member concentrically disposed about said wire guide means and defining means through which electrical power to said upper electrode contact tip is provided and defining therein a first chamber within which cooling water is circulated;

an outer power-cooling assembly comprising an outer power tube member concentrically disposed about said first cylindrical member and having means associated therewith for electrically isolating said outer power tube member from said inner power-cooling assembly, said outer power tube member being in electrical communication with said lower electrode contact tip and having at least one means therein defining a cooling water circulation path, the circulation path means comprising a first bore, a second bore and a third bore disposed therebetween and overlapping said first and second bores, said third bore adapted to receive a rod member therein which substantially isolates said first bore from said second bore whereby a cooling water circulation path is defined thereby; and a gas supply means comprising at least one bore in said outer power tube member through which gas can be conveyed from the first end to the second end of said housing proximate said lower electrode contact tip.

14. The improved GMAW torch of claim 13 including means in communication with the wire guide tube bore for conveying gas therethrough.

15. An improved hot wire gas-tungsten arc welding torch comprising:

a torch housing having a first and a second end;

wire guide means centrally disposed within said housing, said wire guide means comprising a wire guide tube having a bore disposed therein, said bore dimension to convey a welding wire therethrough, an upper electrode contact tip, a lower electrode contact tip and a dielectric material disposed therebetween positioned at one end of said wire guide tube, said upper and lower electrode contact tips defining means whereby electrical contact with the welding wire is established within said torch housing;

an inner power-cooling assembly comprising: a first cylindrical member concentrically disposed about said wire guide means and defining means through which electrical power to said upper electrode contact tip is provided and defining therewithin a first chamber within which cooling water is circulated; and an outer power-cooling assembly comprising an outer power tube member concentrically disposed about said first cylindrical member and having means associated therewith for electrically isolating said outer power tube member from said inner power-cooling assembly, said outer power tube member being in electrical communication with said lower electrode contact tip and having at least one means therein defining a cooling water circulation path, the circulation path means comprising a first bore, a second bore and a third bore disposed therebetween and overlapping said first and second bores, said third bore adapted to receive a rod member therein which substantially isolates said first bore from said second bore whereby a cooling water circulation path is defined thereby.

16. The improved torch of claim 15 including means in communication with the wire guide tube bore for conveying gas therethrough.

* * * * *